US007272650B2

(12) United States Patent
Elgebaly et al.

(10) Patent No.: US 7,272,650 B2
(45) Date of Patent: Sep. 18, 2007

(54) COMMUNICATION PROTOCOLS OPERABLE THROUGH NETWORK ADDRESS TRANSLATION (NAT) TYPE DEVICES

(75) Inventors: Hani Elgebaly, Beaverton, OR (US); Key Phomsopha, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 675 days.

(21) Appl. No.: 09/837,449

(22) Filed: Apr. 17, 2001

(65) Prior Publication Data

US 2002/0152325 A1   Oct. 17, 2002

(51) Int. Cl.
*G06F 15/16*   (2006.01)

(52) U.S. Cl. .................... 709/227; 709/223; 709/228; 709/246

(58) Field of Classification Search ................ 709/227, 709/228, 245, 246, 250
See application file for complete search history.

(56) References Cited

U.S. PATENT DOCUMENTS

| 6,360,265 | B1 * | 3/2002 | Falck et al. | 709/227 |
| 6,661,799 | B1 * | 12/2003 | Molitor | 370/401 |
| 2002/0042832 | A1 * | 4/2002 | Fallentine et al. | 709/230 |
| 2002/0120760 | A1 * | 8/2002 | Kimchi et al. | 709/230 |
| 2002/0122416 | A1 * | 9/2002 | Xu et al. | 370/352 |
| 2002/0133549 | A1 * | 9/2002 | Warrier et al. | 709/204 |
| 2003/0009561 | A1 * | 1/2003 | Sollee | 709/227 |
| 2003/0206536 | A1 * | 11/2003 | Maggenti | 370/328 |

FOREIGN PATENT DOCUMENTS

| WO | WO 00/33537 | 6/2000 |
| WO | WO 02/03217 A1 | 1/2002 |
| WO | WO0203217 A1 * | 1/2002 |
| WO | WO 02/073330 A2 | 9/2002 |

OTHER PUBLICATIONS

Network Safety, "A NAT as a Firewall", Apr. 19, 1996, Web Page, Retreived from http:www.safety.net/indfw.html on Jul. 21, 2004.*
J. Rosenberg, J. Weinberger, and H. Schulzrinne, "An Extension to the Session Initiation Protocol (SIP) for Symmetric Response Routing", Sep. 27, 2002, Internet Draft.*

(Continued)

*Primary Examiner*—Glenton B. Burgess
*Assistant Examiner*—Aaron Strange
(74) *Attorney, Agent, or Firm*—Blakely, Sokoloff, Taylor & Zafman LLP

(57) ABSTRACT

Communication between a first device having a non-routable address behind a network address translation type of device (translator), and a second device, according to a protocol in which the first device embeds its non-routable address and a communication port within protocol data sent to the second device. Translation assigns an apparent origin and apparent port for the protocol data different from the non-routable address and embedded port. The second device is configured to identify the embedded non-routable data and utilize the apparent origin and apparent port.

2 Claims, 8 Drawing Sheets

OTHER PUBLICATIONS

J. Rosenberg and H. Schulzrinne, "SIP Traversal through Residential and Enterprise NATs and Firewalls", 11/17/200, Internet Draft.*

U.S. Appl. No. 60/215,872, Goldberg et al. (cd).*

Rosenberg J. et al., "Getting SIP Through Firewalls and NATs," RFC Document, Feb. 22, 2000, XP-002167710.

Fredrik Thernelius, "SIP, NAT, and Firewalls," Master's Thesis (Ericsson), May 2000, XP-002209773, Stockholm, Sweden.

First Office Action from German Patent Application No. 102 96 660.5-31 mailed Jan. 4, 2006, English translation and German associate's letter dated Mar. 20, 2006 (17 pgs).

\* cited by examiner

COMMUNICATION PROTOCOLS OPERABLE THROUGH NETWORK ADDRESS TRANSLATION (NAT) TYPE DEVICES

FIELD OF THE INVENTION

The invention generally relates to network based telephony, and more particularly to using a communication protocols through a translating access points, such as a NAT device, without having to alter the translating access point to support the communication protocol.

BACKGROUND

Recent years has given significant advances in networking technology and reduced pricing, resulting in a significant buildup of networking infrastructure. As illustrated in FIG. 1, many households 100 and businesses 106 are interconnected through private and public networks 104, the most well known network being the Internet. Most networks now utilize the Transmission Control Protocol/Internet Protocol (TCP/IP) communication protocol, in which network locations are assigned a globally unique 32-bit numeric address typically presented in dot quad notation (four numbers each having values of zero to 255). TCP/IP network traffic is routed based on a destination IP address for the traffic.

Unfortunately, the explosive growth of the Internet has resulted in a shortage of available network addresses. To compensate, attempts have been made to share a single network address among multiple computers. One well-known example is Network Address Translation (NAT), which hides an internal network behind an access point 102, 108 in communication with an external network 104 by routing network traffic through the access point. Internal networks generally use private network addresses that are not routable on the public network without translation. During operation, access points 102, 108 translate source IP address and ports of outgoing network traffic to map the traffic to an external or public address of the access point and a unique port. Conversely, the access point translates incoming network traffic destination IP address and unique port back to an original internal address and port. However, access points generally ignore incoming network traffic not received in response to outgoing network traffic that was translated, and incoming traffic directed to unmapped ports.

Network traffic translation performed by a translating access point such as a NAT gateway/router 102, firewall 108, or the like, is transparent to many applications. However, such translations break some protocols under certain circumstances, such as audiovisual conferencing protocols, security protocols, game protocols, and other protocols that embed a machine's network address within network traffic. For example, International Telecommunication Union (ITU) standard H.323, Internet Engineering Task Force (IETF) Media Gateway Control Protocol (MGCP/Megaco), IETF Session Initiation Protocol (SIP), IP Security (IPSec), end-to-end security models not allowing packet header alterations, and the File Transfer Protocol (FTP), are all examples of protocols that break if used behind translating access points such as NAT devices.

For example, in FIG. 1, an H.323 client 116 inspects its network configuration and registers it with an H.323 gateway 118 as protocol data. Similarly, H.323 client 110 registers itself with the gateway. However, because H.323 client 110 receives network service from an Internet service provider 112 that is in a private network behind a NAT gateway/router 114, the configuration indicated in the protocol data for client 110 cannot be used by H.323 gateway 118 or client 116 to access client 110.

One proposed solution to this problem is to modify access points to be aware of the protocol. Unfortunately, due to the large number of installed access points, this is an expensive solution. To work properly, all translating access points have to be revised to support the protocol; if any one upstream non-supporting translating access point is reached, then the protocol fails.

BRIEF DESCRIPTION OF THE DRAWINGS

The features and advantages of the present invention will become apparent from the following detailed description of the present invention in which.

DETAILED DESCRIPTION

In one embodiment, the limitations of NAT and other translating access points can be overcome through modification of communication protocols so that they are able to recognize and compensate for translation. As used herein, the term "NAT" refers to any access point which alters origin and/or port values of passing network traffic.

Generally, a communication protocol that passes signaling information within protocol data, such as ITU H.323 or other protocol, can be modified so that an endpoint behind a NAT is required to send data through the NAT device using a desired communication port for receiving responsive data. This primes an endpoint's NAT device to receive responsive data from the particular network address on the desired communication port.

More specifically, communication endpoint behavior is modified to use the same port for listening for and originating communication sessions (e.g., for both signaling and streaming of content) (in the specification and claims that follow, the term "content" refers to audio-only data, video-only data, combined audio and video data, or other data that may be transmitted between endpoints).

Receivers of protocol data, e.g., the registration server or other communication endpoints, are configured to inspect embedded endpoint network location values, e.g., network address, communication port (hereafter simply port), etc. to ensure they correspond to a routable network address. If an embedded address is non-routable, NAT has been detected, and origin address and port values of the network traffic packets comprising the protocol data are used instead of embedded values.

These alterations to a communication protocol allow supporting NAT devices and other such translating access points without dependency on special servers, proxies, or revisions to NAT hardware. In addition, although the figures, for clarity of presentation, may not illustrate all operations by all endpoints as being symmetric, these changes can be made symmetric so that there is no differentiation between endpoint behavior inside or outside a NAT.

Figure 2:
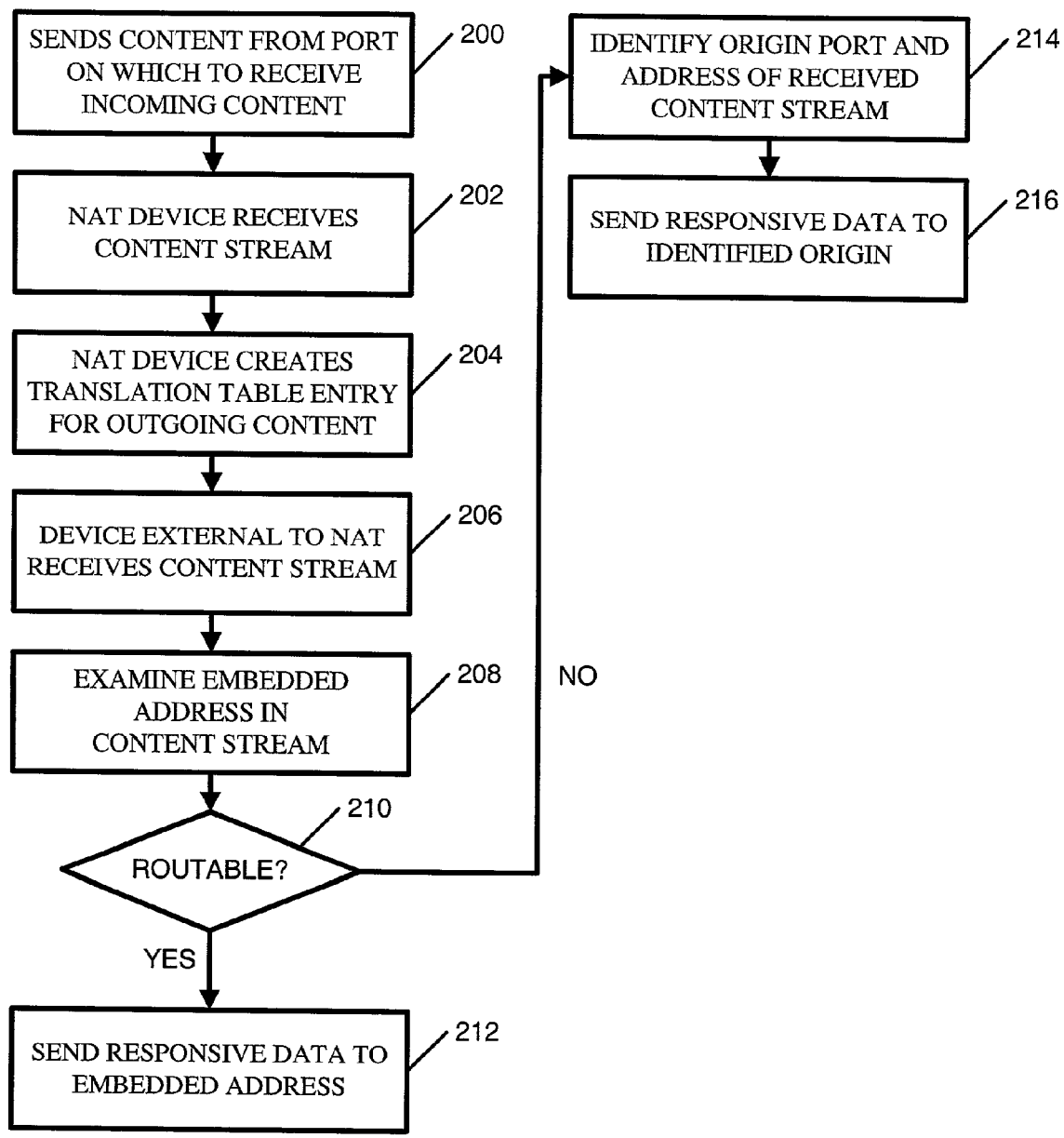
FIG. 2 is a flowchart according to one embodiment illustrating a general overview for an endpoint internal to a NAT device to establish a media session with another endpoint external to the NAT device.

FIG. 2 is a flowchart according to one embodiment illustrating a general overview for an endpoint internal to a NAT device to establish a media session with another endpoint external to the NAT device according to a protocol such as RTP and RTCP. Note that RTP/RTCP is used for exemplary purposes as they are well known communication protocols utilizing call setup and signaling operations. However, it will be appreciated by one skilled in the art that the present invention is generally applicable to other communication protocols.

In the illustrated embodiment, an internal host behind a NAT device sends 200 RTP and RTCP streams from the port on which it expects to receive a corresponding stream. For example, if an endpoint expects to receive audio on port 2244, then it initiates an audio transfer on port 2244. If a NAT device is present, when it receives 202 a data stream for translation, the NAT creates 204 appropriate translation table entries and is thus primed for receiving corresponding responsive data.

External hosts, such as the registration server, or other endpoints, when they receive 206 the data stream, are configured to examine 208 IP addresses embedded within protocol data, e.g., an embedded reference to port 2244, as such embedded references are not viewed by NAT devices. If 210 an embedded address is routable, then the external host sends 212 responsive data to the embedded address.

However, if 210 an embedded address is not routable, e.g., it cannot be routed over the Internet, then the external host identifies 214 the address and port associated with the network traffic packets encoding the protocol data, as this corresponds to the result of the NAT. The external host then sends 216 responsive data to the identified origin address and port, e.g., the external host binds to the receiving ports for sending content back to the internal device. This is required because the NAT device has invalidated the address and/or port values identified in the embedded data. To stream media between an internal host and an external host, the internal host initially sends a media stream so that its NAT device will accept responsive data.

Figure 3:
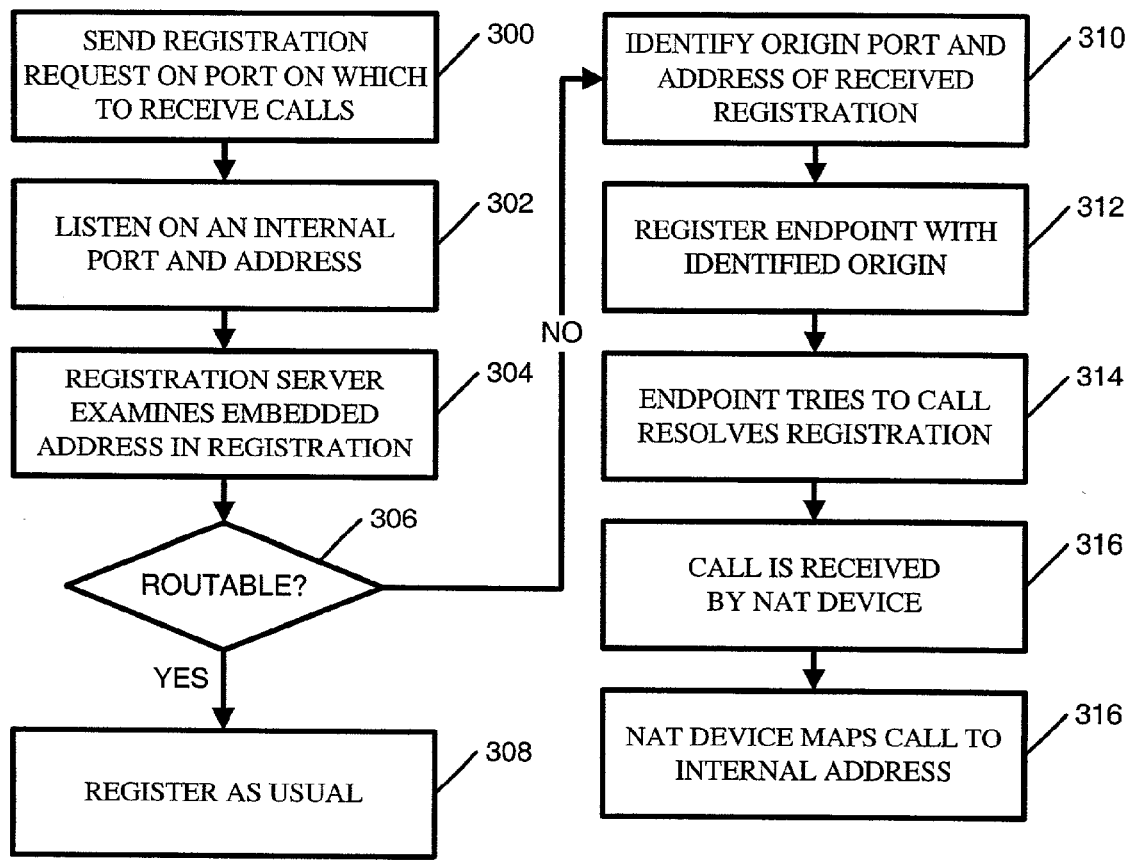
FIG. 3 is a flowchart according to one embodiment illustrating a general overview for an endpoint internal to a NAT device to initiate a session with another endpoint external to the NAT device.

FIG. 3 is a flowchart according to one embodiment illustrating a general overview for an endpoint internal to a NAT device to initiate a session with another endpoint external to the NAT device using SIP, H.323, or other protocol. In this embodiment, the internal host sends 300 a registration request on the same port on which it expects to accept calls, and provides an identity alias. The internal host then listens 302 on an internal address and internal port.

The registration server, e.g., a gatekeeper, SIP registrar, etc., examines 304 the internal address embedded within the registration to determine if 306 it is a routable address. If it is routable, then the registration server registers 308 the address, port and identity alias as usual. If it is not routable, then the registration server identifies 310 the origin address and port associated with the network traffic packets encoding the protocol data, as this corresponds to the result of the NAT, and registers 312 the internal host at the identified origin address with the identity alias.

An external endpoint trying to call 314 the internal endpoint resolves the internal endpoint's identity alias as the identified 310 origin address and port of the NAT device. The internal host is listening 302 on the ports that are mapped to the external ports registered 312 by the registration server. When the NAT device receives 316 the incoming call, which is routed through the registration server, the NAT device maps 318 the call from the external endpoint to the internal endpoint.

Content streaming can be established as discussed above for FIG. 2.

Figure 4:
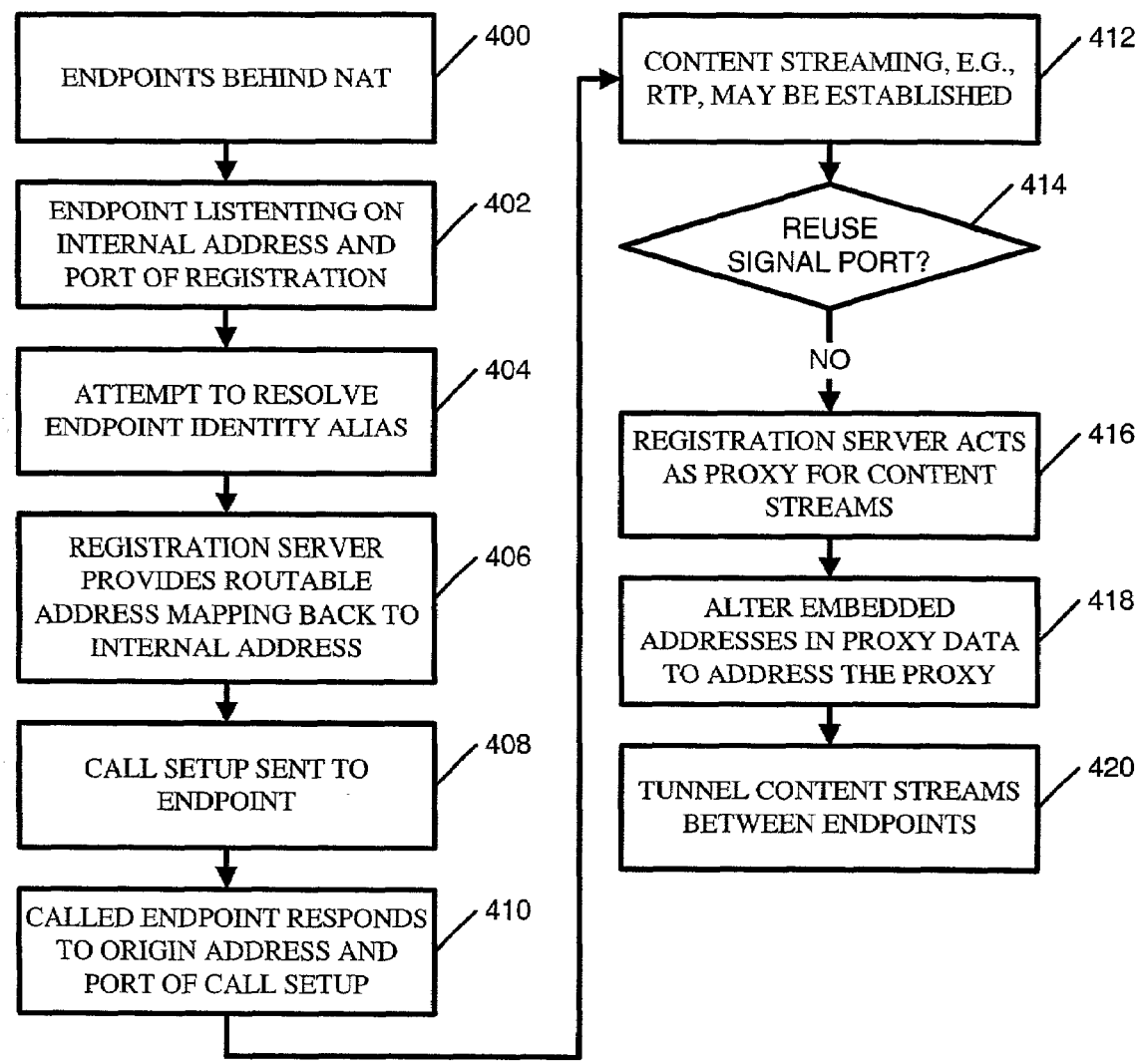
FIG. 4 is a flowchart according to one embodiment illustrating a general overview for two endpoints internal to NAT devices where one endpoint calls the other.

FIG. 4 is a flowchart according to one embodiment illustrating a general overview for two endpoints internal 400 to NAT devices where one endpoint calls the other using H.323, SIP or other protocol.

In this embodiment, both endpoints listen 402 on internal addresses provided to a registration server during registration. A first of the endpoints attempts to resolve 404 the other endpoints identity alias. As discussed above, the registration server provides 406 a routable address back to the endpoint that maps to the internal address on which the other endpoint is listening 402. The first endpoint sends 408 a call setup to the other endpoint through the registration server, and the called endpoint responds 410 to the origin address and origin port of the call setup. Since both endpoints are behind a NAT, the registration server will intercept communications to route both control and media information, and act as a proxy.

Content streaming may then be established 412, to do so, there are two options. A first option is that the existing communication address and port from the call setup may be used to transfer content streaming. A second option is to signal for use of a different address and port. However, since both endpoints are behind NAT devices, if 414 the port is not to be reused, then the registration server acts 416 as a proxy or intermediary for the content streams. This is required because only the registration server is known to both NAT devices to be a valid source for incoming data. In one embodiment, the registration server proxy alters 418 embedded addresses within the protocol data to point to the registration server, and then tunnels 420 the content traffic between the endpoints. In one embodiment, the registration server acts as a proxy even if 416 signal ports are reused.

Figure 5:
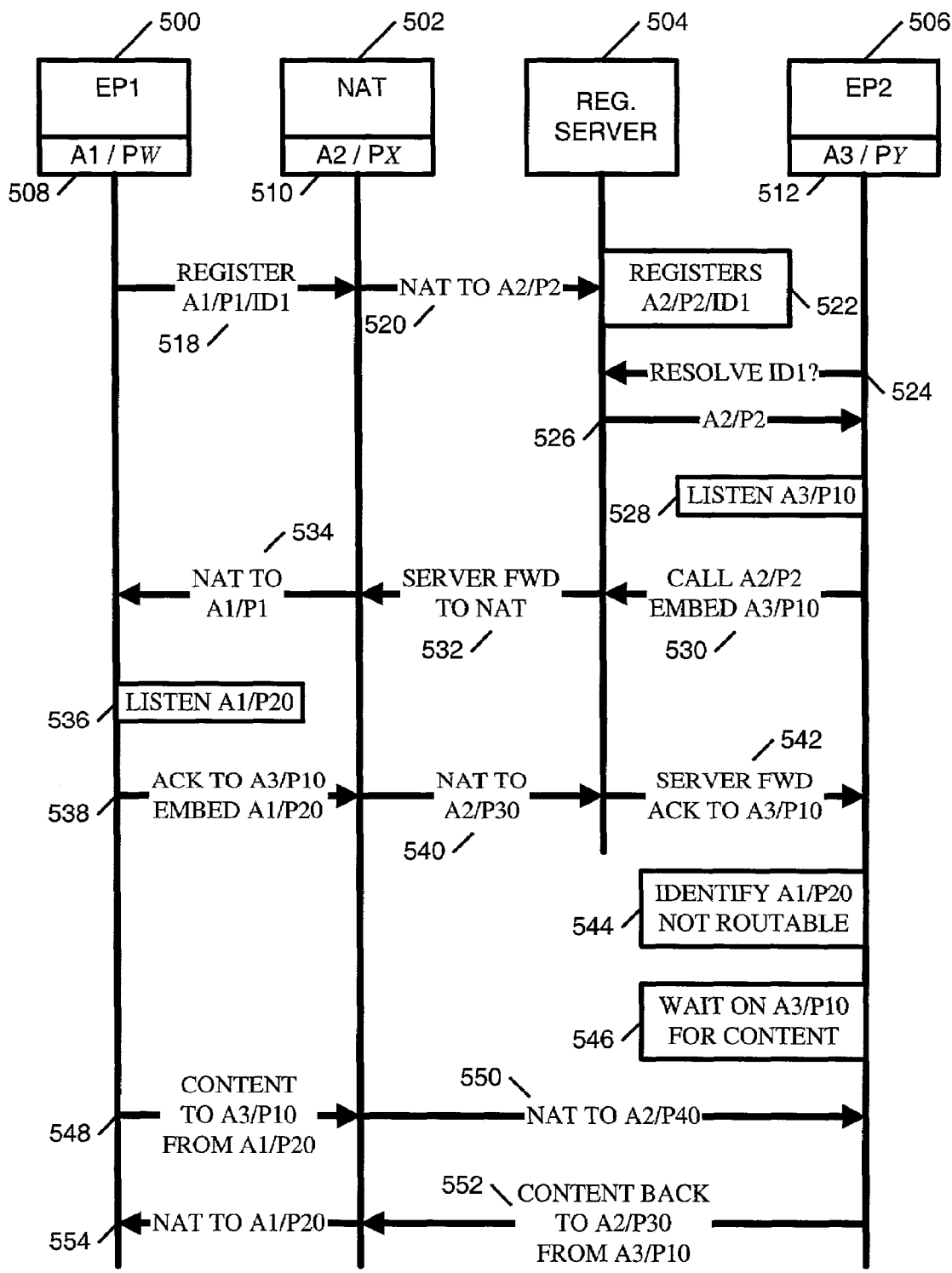
FIG. 5 illustrates, according to one embodiment, a top-down timeline of protocol transactions in which a first endpoint behind a NAT device receives a call from a second endpoint.

FIG. 5 illustrates, according to one embodiment, a top-down timeline of protocol transactions in which a first endpoint EP1 500 behind a NAT device receives a call from a second endpoint EP2 506. Please note that some operations in the illustrated timelines may occur concurrently, or in a different order.

A registration server 504 serves as an intermediary, or switchboard, to facilitate communications between endpoints. The registration server tracks endpoint identities, or aliases, and network locations, e.g., addresses, etc., for the endpoints. Due to communications passing through a NAT device, as will be discussed below, the communication protocol employed by the endpoints requires the first endpoint to prime its NAT device for receiving data from the second endpoint on a desired port.

As discussed above, the illustrated communication protocol applies to any protocol utilizing protocol data containing an endpoint's network address, e.g., network address and possibly a desired communication port. Assume an H.323 based telephony protocol is being used, and that each of EP1 500, NAT 502, and EP2 506 have respective IP network addresses and communication ports 508, 510, 512, and that the IP address remains static for the duration of the example, but that different port values W, X, Y are used. It will be appreciated by one skilled in the art, however, that static IP addresses, or even the IP protocol, are not required. For example, protocols, such as AppleTalk, NetBios Enhanced User Interface (Netbeui), etc., may be used.

EP1 500 sends 518 a registration message to the call registration server 504, telling the registration server, by way of embedded protocol data, that EP1 is to be contacted at address A1 port P1, and has identifier (e.g., an alias) ID1. (Please note that all port designations herein are exemplary and have no particular significance, and the figures use the notation A1/P1 to represent address A1 port P1.)

The registration message passes through the NAT 502, and the NAT translates 520 the network traffic containing the registration message to appear to have originated from address A2 port P2. The registration server determines (not illustrated) that the embedded address A1 port P1 in the protocol data is non-routable, e.g., a private address inside of a NAT, and therefore that translation has occurred. Consequently, the registration server instead registers 522 EP1 as being at address A2 port P2 with identifier ID1 based on the packet headers of the network traffic comprising the registration message.

EP2 then attempts to contact EP1. To do so, EP2 tries to resolve 524 EP1's current network address by sending a resolution request 524 for EP1's ID1 to the registration server 504. The registration server looks up the entry for ID1 and sends a response 526 indicating EP1 has a network address of A2 port P2. EP2 then listens 528 at address A3 port P10 (an arbitrary port chosen by EP2) for receiving content, and initiates a call request 530 to EP1 at address A2 port P2 through the registration server. EP2's call request is routed through to the registration server 504 which in turn forwards 532 the call request to the NAT device 502.

Assuming the NAT device rejects incoming network traffic not originating from a known network address and port, e.g., an address to which the NAT device has previously sent network traffic, routing the call request through the registration server is required to cause the NAT device to accept the call request originating from EP2, as the routed request appears responsive to EP1's registration 518. The NAT device translates 534 the network traffic comprising the call request directed to address A2 port P2 for delivery to EP1 at address A1 port P1.

Once EP1 receives the call request, it then listens 536 at address A1 port P20 (an arbitrary port chosen by EP1), and acknowledges 538 the call request to EP2 at address A3 port P20 (the arbitrary port selected by EP2). Within the protocol data sent to EP2, EP1 indicates it is listening on address A1 port P20. Ordinarily, if EP1 were not behind a NAT device, formation of a communication session would be complete, as EP2 could simply start sending content to address A1 port P20. However, since EP1 is behind a NAT device, EP1's network traffic comprising the acknowledgement is translated 540 to address A2 port P30.

Since the call request 530 was originally forwarded 532 to EP1 by the registration server 504, EP1 sends its acknowledgement 538 to the registration server, which in turn forwards 542 it to EP2 at A3/P10, the address at which EP2 elected to listen 528. At this point, the registration server is no longer needed as an intermediary as EP1 now knows it is to send content to EP2 at address A3 port P10. However, in one embodiment, EP2 does not assume another endpoint is behind a NAT device, hence it tests the acknowledgement to identify 544 that translation has occurred, e.g., that address A1 port P20 embedded in the protocol data is not routable.

Once translation is identified 544, rather than immediately sending content as would occur in a conventional communication session, instead EP2 waits 546 for content to be sent 548 from EP1 to EP2. Note that on sending 548 content to EP2 at address A3 port P10, some NAT devices may reuse port P30 that was set from sending 540 the acknowledgement to EP2 as EP1 is continuing to send to the same destination address and port. When the NAT device translates 550 the content sending, this primes EP1's NAT device to receive reciprocating content back from EP2. EP2, aware of the translation, sends 552 its content to the NAT device, which in turn translates 554 the network traffic comprising the content and delivers it to EP1.

Thus, a communication session is established from EP2 to EP1.

Figure 6:
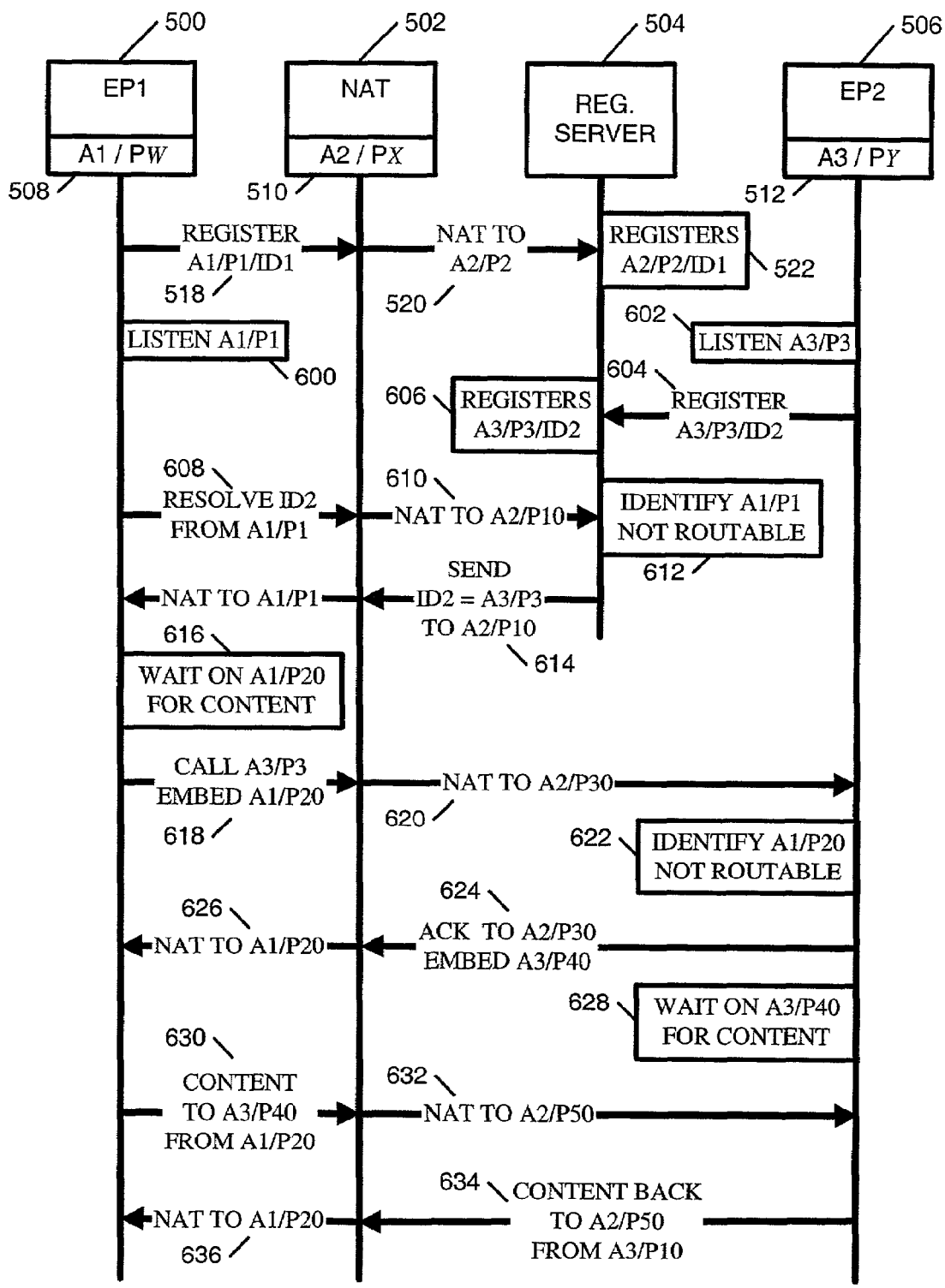
FIG. 6 illustrates, according to one embodiment, a top-down timeline of protocol transactions in which the first endpoint initiates a communication session through the NAT device to the second endpoint.

FIG. 6 illustrates, according to one embodiment, a top-down timeline of protocol transactions in which the first endpoint EP1 500 initiates a communication session through the NAT device 502 to the second endpoint EP2 506. The first endpoint EP1 registers itself 518, 520, 522 with the registration server 504 as discussed in FIG. 5.

EP1 then listens 600 on address A1 port P1, and EP2 listens 602 on address A3 port P3. EP2 sends 604 a registration message to the registration server indicated it has network address A3 port P3, and identity ID2. As discussed above in FIG. 5 for registration 518 of EP1, the registration server performs a check (not illustrated) to determine whether EP2 is behind a firewall. EP2 is not, so the registration server registers EP2 with the provided address values.

To initiate a call from EP1 to EP2, EP1, which is behind the NAT device 502, sends a resolution request 608 to the registration server to resolve ID2. The request is translated 610 and forwarded to the registration server, which looks up the address A3 port P3 registration for EP2. The registration server performs a check and identifies 612 that EP1 is behind a NAT device, e.g., the embedded protocol data comprises a non-routable address, so the registration server sends 614 a resolve response back to EP1 at address A2 port P10, the address assigned 610 by the NAT device when it translated EP1's resolution request 608. In one embodiment, the registration server simply sends responses to resolution requests back to the network address and port identified by the network traffic comprising the resolution request, without inspecting embedded addresses within the protocol data.

EP1 then waits 616 for content, e.g., call completion, on address A1 port P20 (an arbitrary port), and sends 618 a call request to address A3 port P3 per the resolution data sent 614 by the registration server. Embedded within the call request as protocol data is the network address A1 port 20 at which EP1 desires to communicate. The call request is translated 620 by the NAT device to appear as if originating from address A2 (a routable address) port P30 (an arbitrary port), and then forwarded by the NAT device to EP2. EP2 inspects, as discussed previously, the protocol data and identifies 622 that address A1 port P20 is not a routable network address.

Consequently, EP2 sends 624 a call acknowledgement to the NAT device at address A2 port P30, and the NAT in turn forwards 626 the acknowledgement to EP1 at address A1 port P20. The call acknowledgement from EP1 comprises protocol data indicating EP2 wants to receive content from EP1 at address A3 port P40 (an arbitrary port). Since EP2 detected EP1 is behind a NAT device, EP2 does not send content to EP1 since it, and instead waits 628 for EP1 to prime its NAT device by sending content to EP2.

EP1 sends 630 content to EP2 at address A3 port P40 as indicated in EP2's acknowledgement 624. The NAT device translates 632 the media to appear as originating from address A2 port P50 (an arbitrary port). It will be appreciated by one skilled in the art that different NAT devices may choose to re-use port assignments.

Now, having received content from EP1, EP2 can send 634 reciprocating content to the NAT device at address A2 port P50, which in turn causes EP2's content to be translated 636 into being addressed to address A1 port P20 for delivery to EP1.

Thus, a communication session is established from EP1 to EP2.

In one embodiment, registration of an endpoint includes registering, in advance, a listening port at which the endpoint is listening for content. For example, when EP1 resolves 608 ID2, the server returns address A3 port P3 as discussed above, along with port P40 for receiving content. Knowing this port in advance allows EP1 to pre-prime its NAT by sending a dummy packet to EP2, which allows EP2 to immediately send data, such as audio data, to EP1 even before EP1 and EP2 complete negotiating all session parameters, e.g., CODEC to utilize, video bit rate or quality, features, etc.

Figure 7:
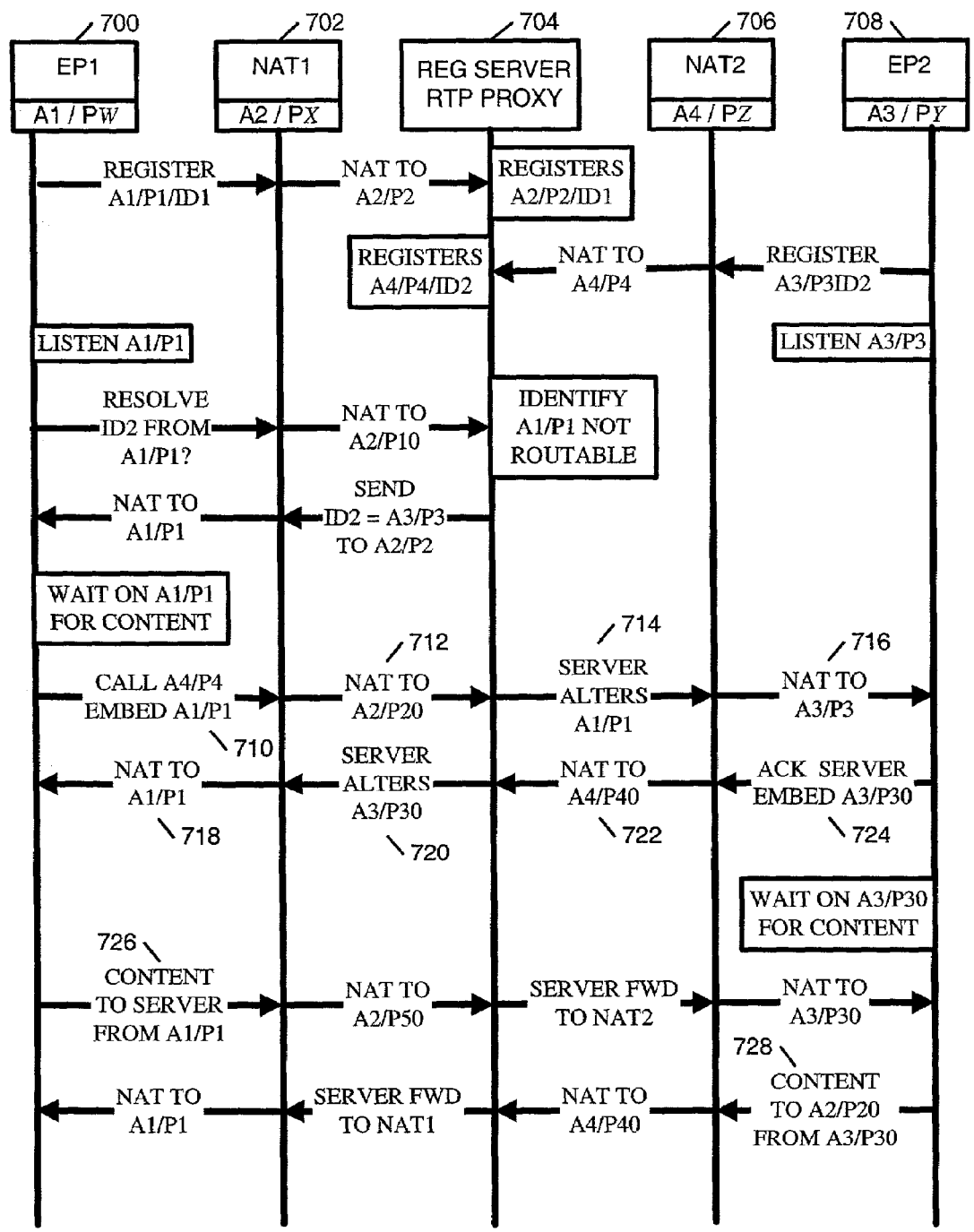
FIG. 7 illustrates, according to one embodiment, a top-down timeline of protocol transactions in which the first endpoint initiates a communication session to a second endpoint, where both endpoints are behind NAT devices.

FIG. 7 illustrates, according to one embodiment, a top-down timeline of protocol transactions in which the first endpoint EP1 700 initiates a communication session to a second endpoint 708, where both endpoints are behind NAT devices 702, 706.

As discussed above in FIG. 4, there are different techniques for achieving proper signaling such that the NAT devices 702, 706 are properly primed to receive responsive data. Registration of the endpoints, signaling of desired communication ports, and identifying NAT translation occurs in accord with principles previously discussed.

In the illustrated embodiment, EP1 issues a call setup request 710 to address A4 port P4 from internal address A1 port P1, and this call is translated 712 by EP1's NAT 702 to apparently originate from address A2 port P20. In an alternate embodiment, call setup requests are directed towards aliases, e.g., ID2, rather than address port pairings as illustrated. This call setup is forwarded to the registration server 704, and the registration server alters 714 the call setup protocol data so that the internal address A1 port P1 points instead to the registration server. In effect, it appears that the registration server is initiating a call to EP2. The altered call setup protocol data is received by EP2's NAT, which translates 716 and delivers it to EP2.

Consequently, EP2 sends 718 an acknowledgement to the server, indicating it is listening on address A3 port 30. EP2's NAT 720 translates the acknowledgement to apparently originate from address A4 port P40. When the registration server receives the acknowledgement, it alters 722 the acknowledgement so that EP2's internal address A3 port P30 points instead to the registration server. The altered acknowledgement is received by EP1's NAT 702, which translates 724 it for delivery to EP1. Thus, both endpoints are tricked into sending 726, 728 their content to the registration server, which in turn forwards it to the appropriate endpoint 700, 708.

Figure 8:
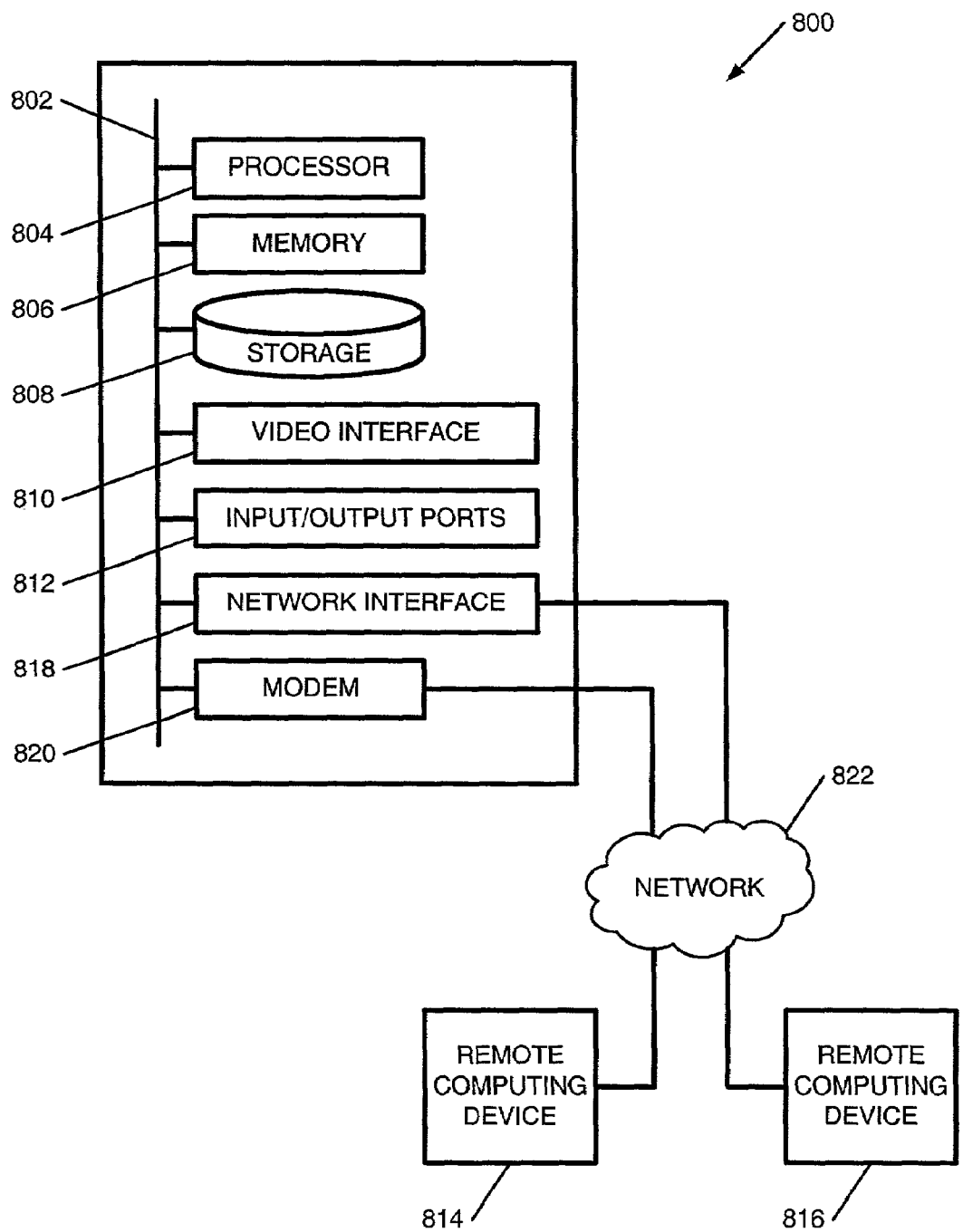
FIG. 8 illustrates a suitable computing environment in which certain aspects of the invention may be implemented.

FIG. 8 and the following discussion are intended to provide a brief, general description of a suitable computing environment in which certain aspects of the illustrated invention may be implemented. For example, an exemplary system for embodying the first endpoint EP1 500 or the registration server 504 of FIG. 5 includes a machine 800 having system bus 802 for coupling various machine components.

Typically, attached to the bus are processors 804, a memory 806 (e.g., RAM, ROM), storage devices 808, a video interface 810, and input/output interface ports 812. The machine may also include embedded controllers, such as Programmable Logic Devices or Arrays (PLD, PLA), Generic or Programmable Array Logic (GAL, PAL), Field-Programmable Gate Arrays (FPGA), Application Specific Integrated Circuits (ASIC), single-chip computers, smart cards, etc.

The invention may be described by reference to program modules that may be stored in memory 806 and/or storage devices 808. Program modules include procedures, functions, programs, components, data structures, and the like, for performing particular tasks or implementing particular abstract data types. One skilled in the art will realize that program modules may be high-level programming language constructs, or low-level hardware instructions and/or contexts, and that they may be utilized in a compressed or encrypted format. Data may be stored in memory 806, storage devices 808, and associated media.

Figure 1:
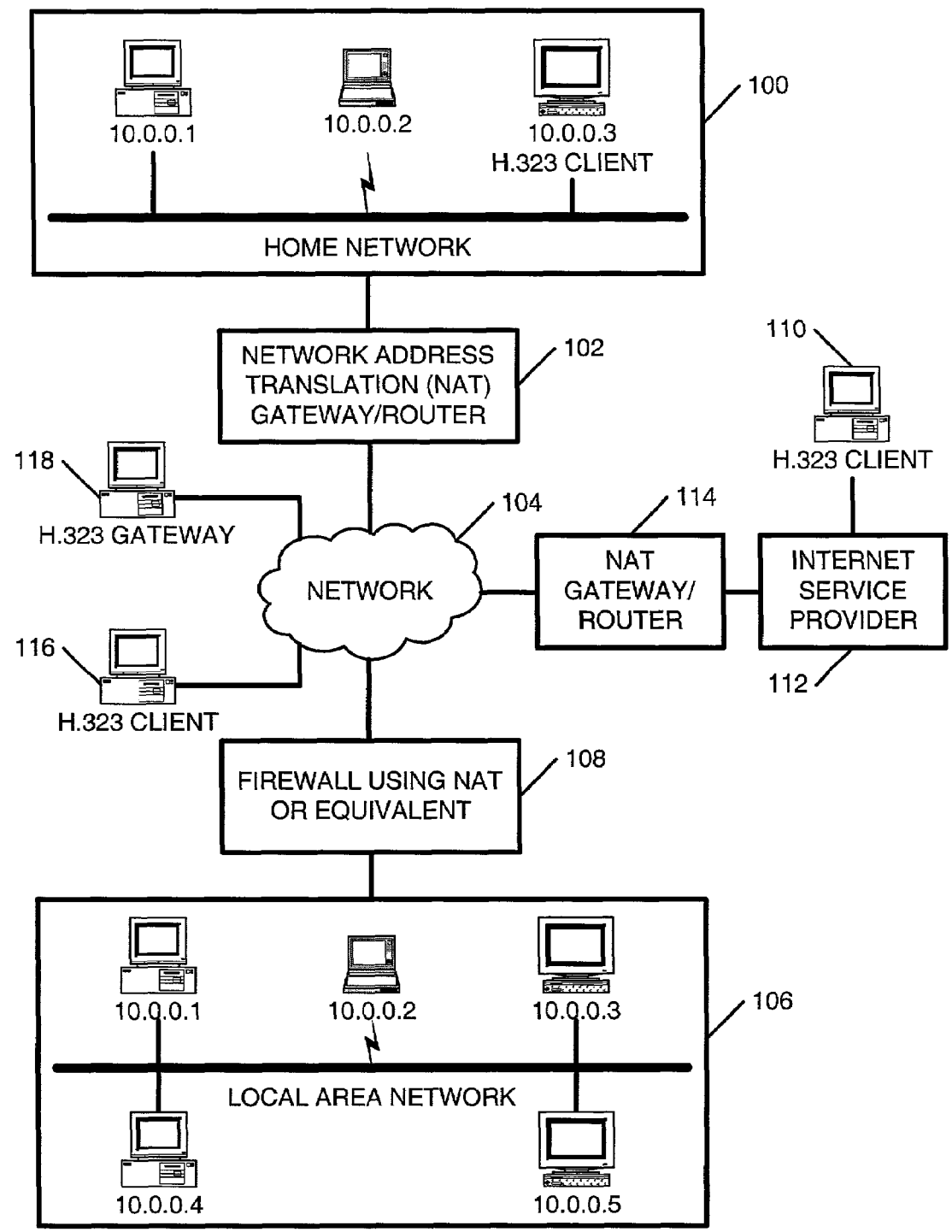
FIG. 1 illustrates a prior art network configuration of computing devices interconnected through a network.

The machine is expected to operate in a networked environment using logical connections to one or more remote machines 814, 816 through a network interface 818, modem 820, or other communication pathway. Machines may be interconnected by way of a wired or wireless network 822, such as the network 104 of FIG. 1, including an intranet, the Internet, local area networks, wide area networks, cellular, cable, laser, satellite, microwave, Blue Tooth, optical, infrared, or other carrier technology.

Program modules may be implemented within a single machine, or processed in a distributed network environment, and be stored in both local and remote memory. Memory and storage devices include hard-drives, floppy-disks, optical storage, magnetic cassettes, tapes, flash memory cards, memory sticks, digital video disks, biological storage, and the like, as well as wired and wireless transmission environments, such as network 822, over which program modules may be delivered in the form of packets, serial data, parallel data, or other suitable transmission format.

Thus, for example, with respect to the illustrated embodiments, assuming machine 800 operates an endpoint, then remote devices 814, 816 may respectively be a second endpoint and a registration server. It will be appreciated that remote machines 814, 816 may be configured like machine 800, and therefore include many or all of the elements discussed for machine. It should also be appreciated that machines 800, 814, 816 may be embodied within a single device, or separate communicatively-coupled components.

Illustrated methods, and corresponding written descriptions thereof, are intended to illustrate machine-accessible media storing directives, or the like, which may be incorporated into single and multi-processor machines, portable computers, such as handheld devices including Personal Digital Assistants (PDAs), cellular telephones, and the like. Having described and illustrated the principles of the invention with reference to illustrated embodiments, it will be recognized that the illustrated embodiments can be modified in arrangement and detail without departing from such principles.

And, even though the foregoing discussion has focused on particular embodiments, it is understood that other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments, and unless implicitly or expressly indicated otherwise, embodiments are combinable into other embodiments. Consequently, in view of the wide variety of permutations to the above-described embodiments, the detailed description is intended to be illustrative only, and should not be taken as limiting the scope of the invention.

What is claimed as the invention, therefore, is all such modifications as may come within the scope and spirit of the following claims and equivalents thereto.

What is claimed is:

1. A method for a registration server to facilitate communicating between a first endpoint behind a network address translator (NAT) and a second endpoint, comprising:

receiving a first registration for the first endpoint according to a protocol utilizing a single communication port for both setting up and transferring data during a communication session, said registration comprising an embedded network address, a port primed by the first endpoint, and an alias for the first endpoint, said priming including sending data from the first endpoint using the port to prime the NAT to receive responsive data on the port;

determining the embedded network address is a non-routable address; and registering the first endpoint with an apparent origin address, port, and alias from which said registration originated;

receiving from the second endpoint a resolution request for the alias and replying to said request with at least the apparent origin address;

receiving an initiation for the session from the second endpoint;

forwarding the session initiation to the first endpoint at the apparent origin address;

receiving from the first endpoint an acknowledgement of the session initiation; and forwarding the acknowledgement to the second endpoint, the second endpoint determining whether an embedded network address in the acknowledgement is not routable, and if so, the second endpoint commencing waiting for data to be sent to the second endpoint from the first endpoint through the NAT.

2. The method of claim 1, wherein the data to be sent to the second endpoint from the first endpoint comprises audiovisual data.

* * * * *